United States Patent [19]

Taylor

[11] Patent Number: 4,515,123
[45] Date of Patent: May 7, 1985

[54] ROTARY INTERNAL COMBUSTION ENGINE

[76] Inventor: John L. Taylor, 12724 Barlin Ave., Downey, Calif. 90242

[21] Appl. No.: 512,325

[22] Filed: Jul. 11, 1983

[51] Int. Cl.³ .............................................. F02B 53/00
[52] U.S. Cl. ................................................... 123/222
[58] Field of Search .................. 123/222, 231; 418/198

[56] References Cited

U.S. PATENT DOCUMENTS

| | | | |
|---|---|---|---|
| 714,582 | 11/1902 | Johnson | 418/198 X |
| 1,228,806 | 6/1917 | Morris | 123/222 |
| 1,808,084 | 6/1931 | Tidd | 123/231 |
| 2,124,542 | 7/1938 | Chisholm | 123/222 |
| 2,179,401 | 11/1939 | Chkliar | 123/231 |
| 2,256,418 | 9/1941 | Switzer | 418/198 X |
| 4,154,208 | 5/1979 | Kunieda et al. | 123/236 |

FOREIGN PATENT DOCUMENTS

| | | | |
|---|---|---|---|
| 287689 | 10/1915 | Fed. Rep. of Germany | 123/222 |
| 569615 | 1/1924 | France | 123/231 |
| 1302333 | 7/1962 | France | 123/222 |

*Primary Examiner*—Michael Koczo
*Attorney, Agent, or Firm*—John T. Matlago

[57] ABSTRACT

A rotary internal combustion engine is disclosed which provides a power rotor that rotates about its center on a shaft in a stator housing. The power rotor has spring-loaded sliding vanes seated in diametrically opposed radial slots thereon. The outer ends of the vanes contact the interior surface of the stator housing at all times as they sweep through an arcuate compression and expansion chamber defined therein. Adjacent the stator housing is a housing portion having a cylindrical cavity in which a rotary transfer valve rotates on a shaft. The periphery of the rotary transfer valve which has a sealing contact with the interior surface of the cylindrical cavity has generally U-shaped pockets formed on diametrically opposed portions thereof. A cam wheel assembly is keyed to the shaft of the power rotor and a follower in the form of a timing wheel is keyed to the shaft of the rotary transfer valve. The action of the continuously rotating cam wheel assembly on the timing wheel provides for intermittently rotatably advancing the rotary transfer valve to position each pocket thereon opposite a port provided on the rear end of the compression chamber and then opposite a port provided on the front end of the expansion chamber to thereby transfer a compressed quantity of fuel-air mixture from the leading side of a vane to the trailing side thereof as the vane is rotatably advanced by the power rotor from the compression chamber into the expansion chamber.

12 Claims, 15 Drawing Figures

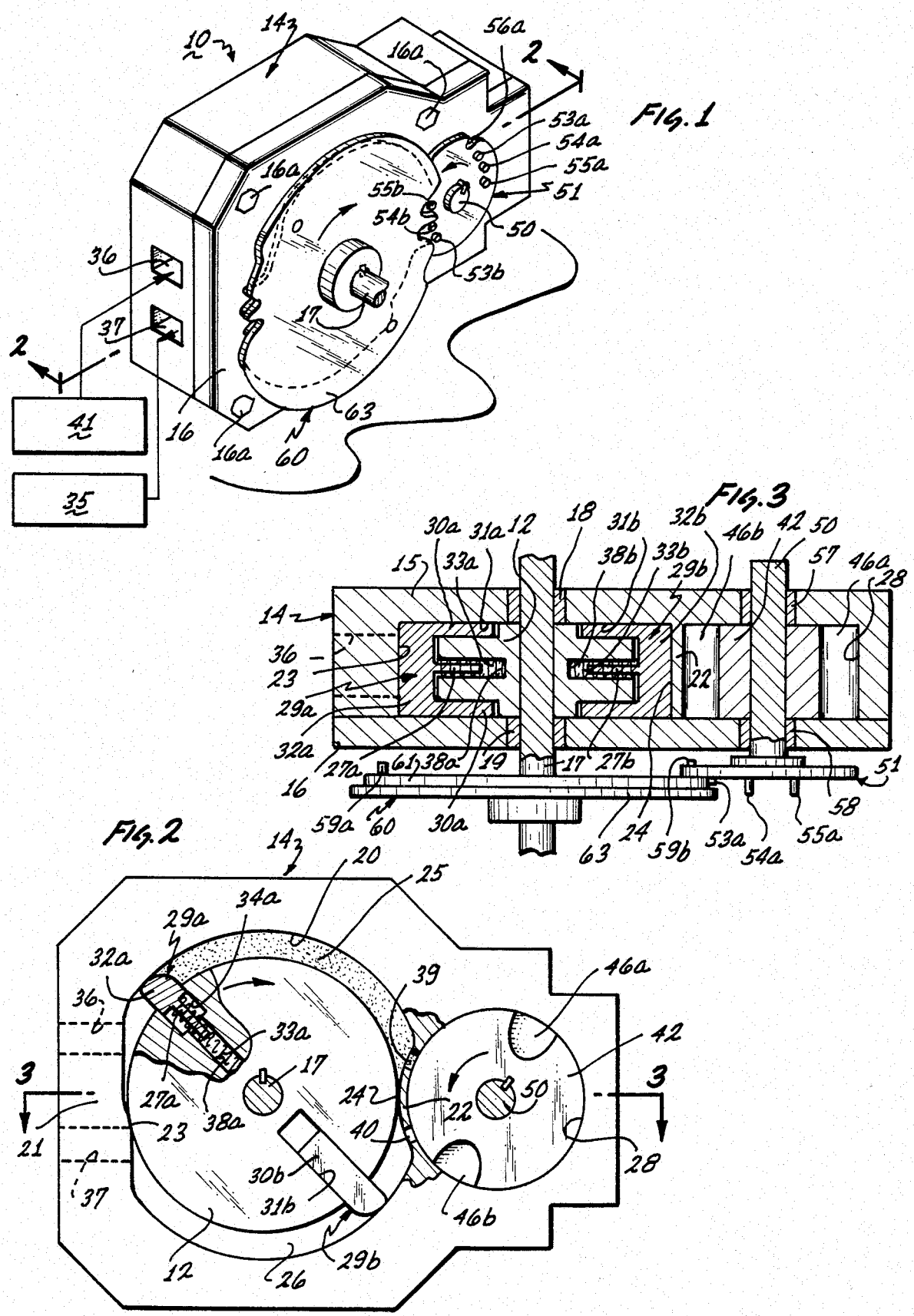

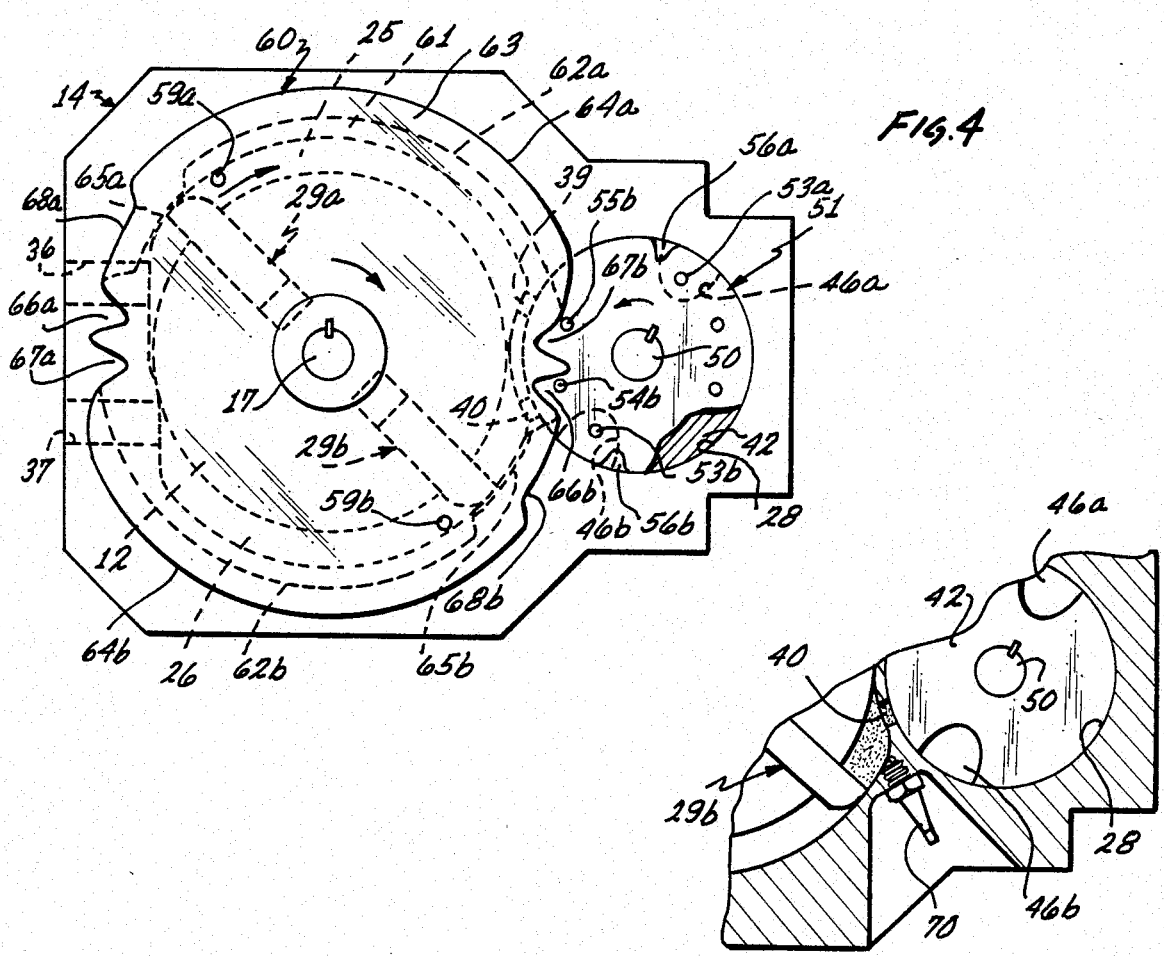
Fig. 4
Fig. 4a
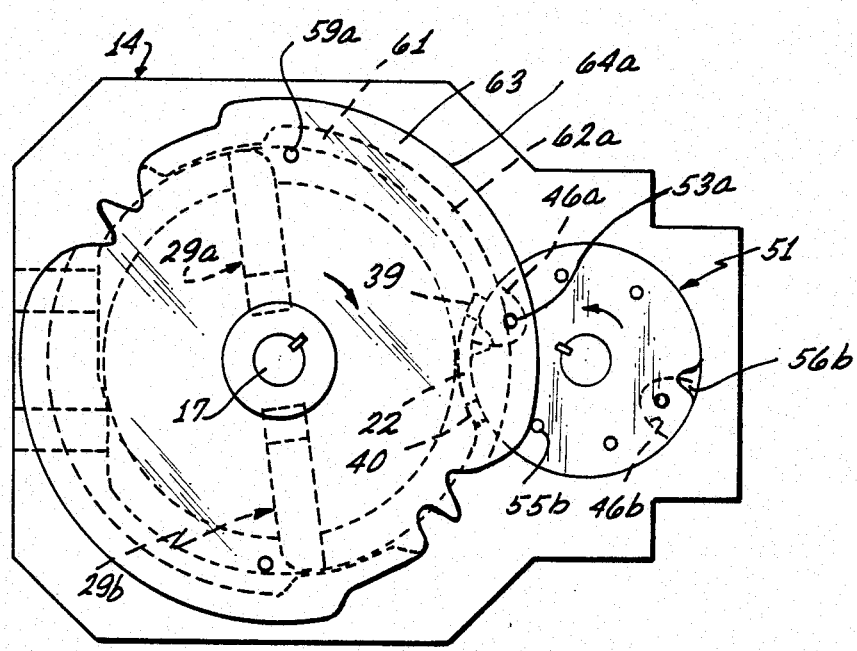
Fig. 5

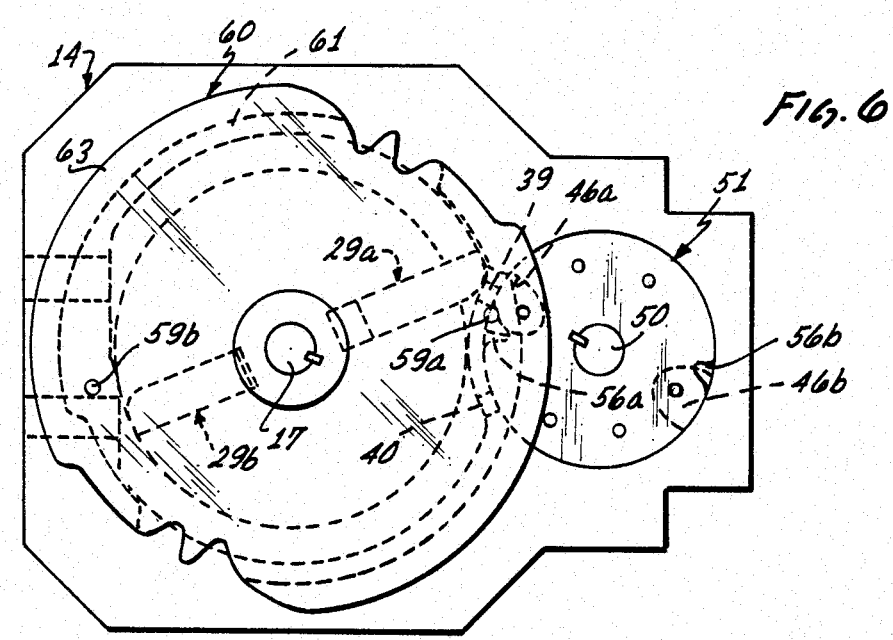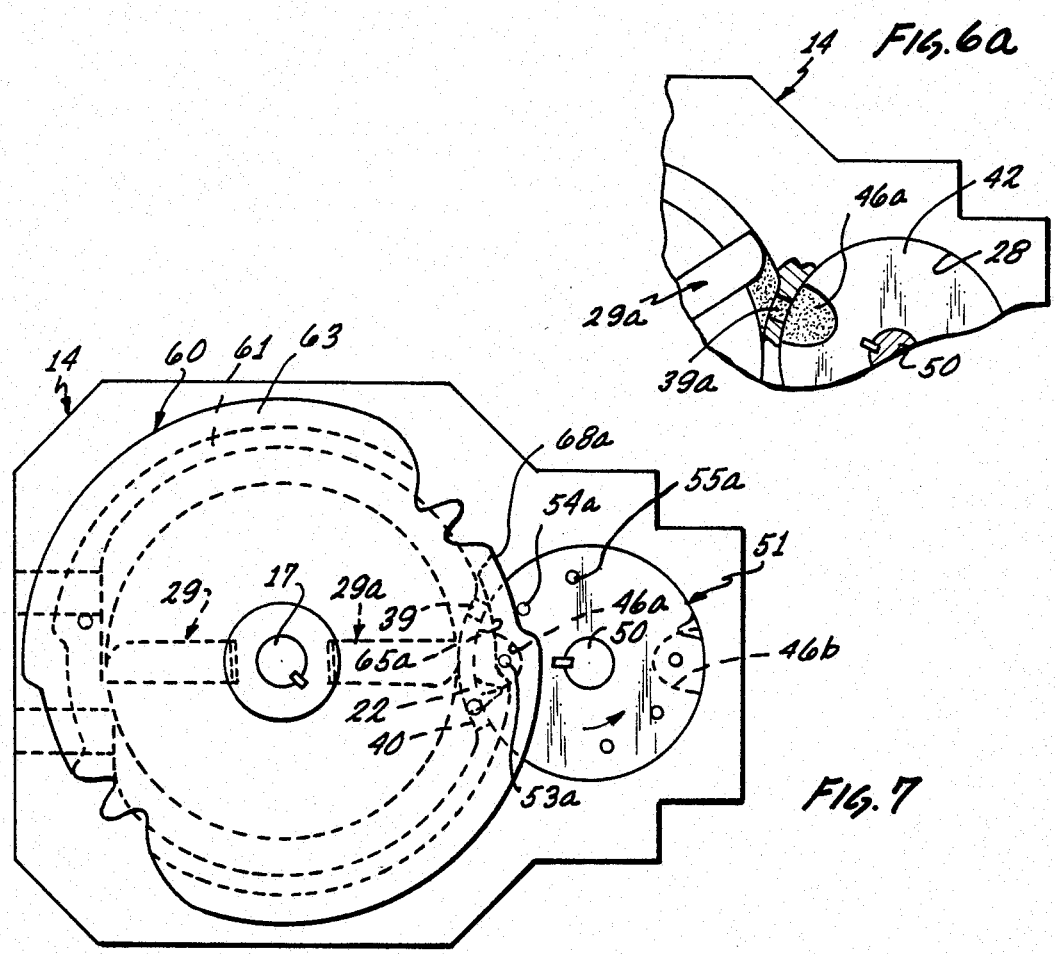

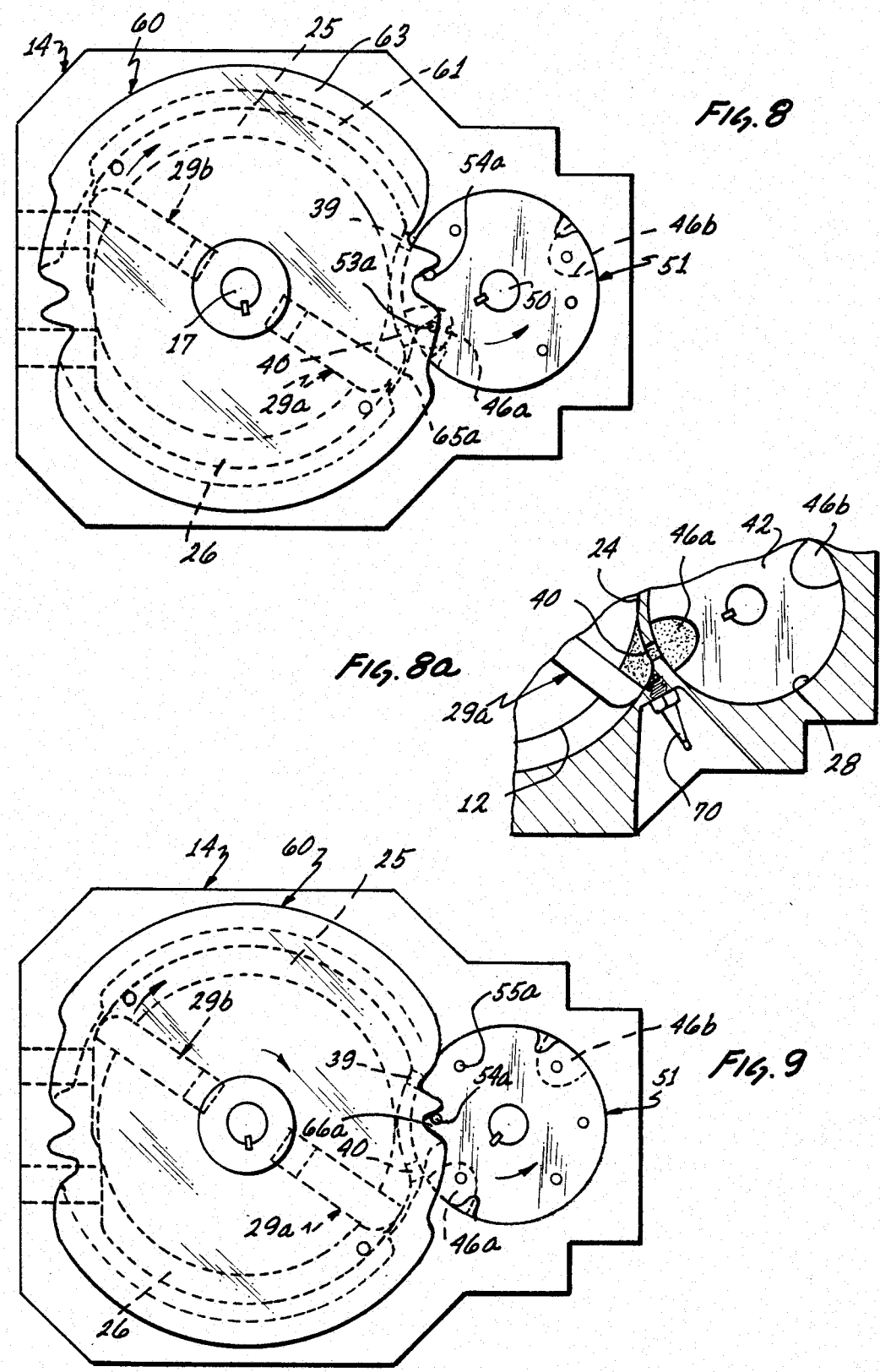

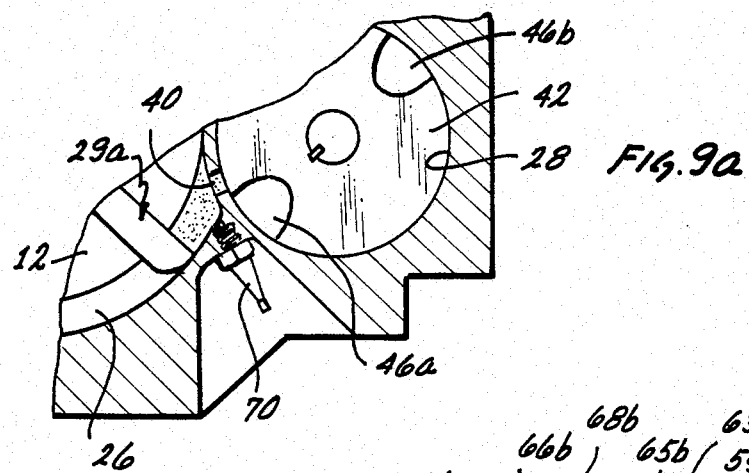
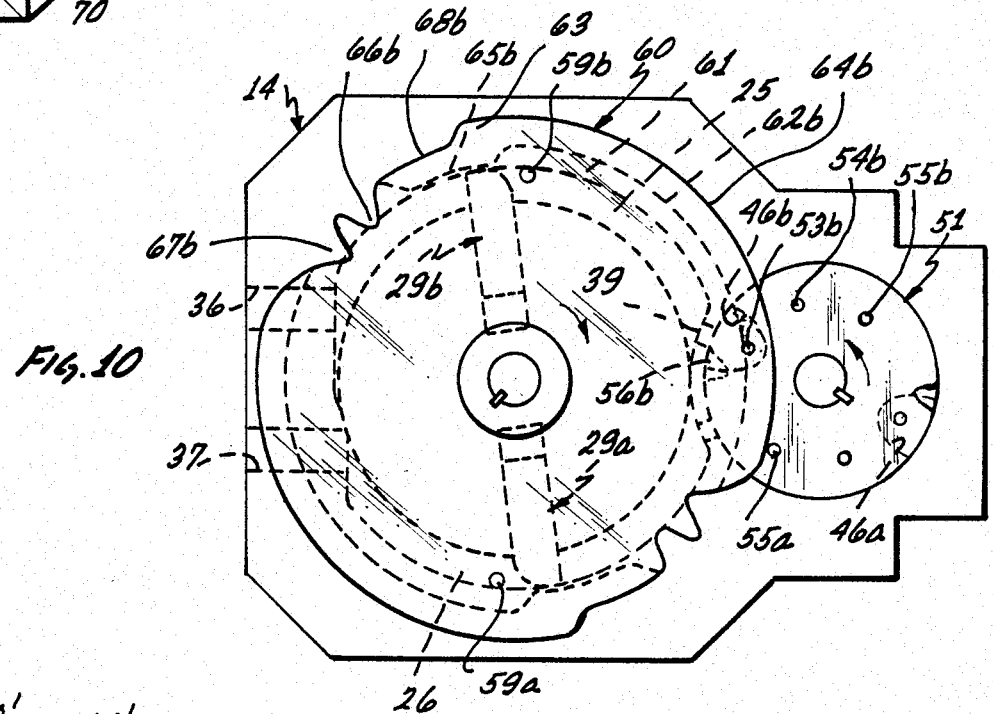
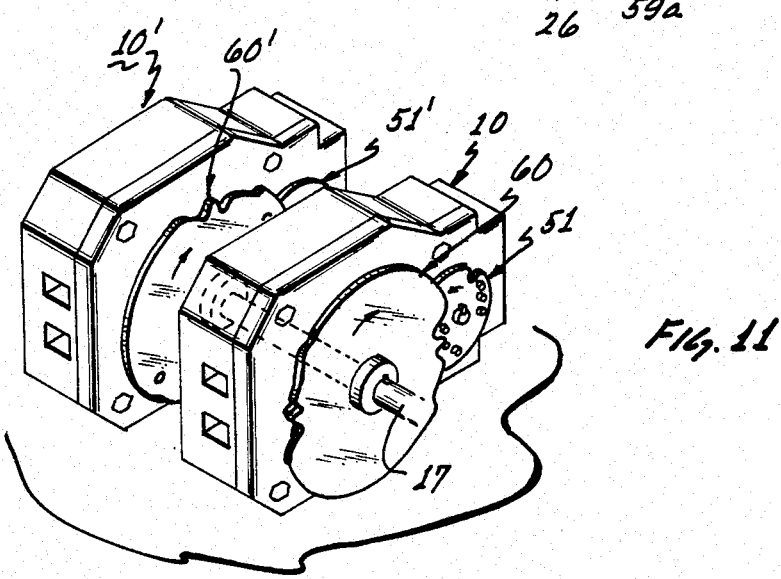

ROTARY INTERNAL COMBUSTION ENGINE

BACKGROUND AND SUMMARY OF THE INVENTION

This invention relates to rotary internal combustion engines and more particularly to improvements in the structure thereof.

Internal combustion rotary engines are well known which provide a power rotor which rotates about its center and has spring-loaded sliding vanes thereon which contact the adjacent interior surface of the stator housing at all times as they sweep through an arcuate compression and expansion chamber defined therein. In such an engine, each vane sweeps through the compression chamber to compress a fuel-air mixture therein and then the compressed mixture is transferred in some manner by a rotary transfer valve to the trailing side of the vane in the expansion chamber where it is ignited to cause the vane to drive the rotor. The rotary transfer valves heretofore proposed for such purpose have not been entirely satisfactory. There is thus a need in such a rotary internal combustion engine to provide an improved rotary transfer valve mechanism which can be more readily controlled to transfer a compressed fuel-air mixture in a reliable manner from the leading side to the trailing side of each vane as it advances from the compression chamber into the expansion chamber.

In accordance with the present invention, a power rotor is secured to drive a shaft so as to rotate in a stator cavity of a housing. The power rotor includes two spring-loaded vanes seated in diametrically opposed radial slots. The internal surface of the stator cavity in the housing is generally ovally shaped in that it is provided on one side thereof with a segment portion defining on the interior surface thereof an inwardly directed tip and provided on the opposite side thereof with an inwardly curved wall portion defining on the interior surface thereof a crest. The sealing contact of the periphery of the rotating rotor with the tip and crest divide the circumferential space provided between the rotor and the interior surface of the cavity into two arcuate chambers, a compression chamber and an expansion chamber.

Included in the housing for the power rotor and located on the side of the stator cavity therefor is an additional cavity the cylindrical internal surface of which is formed in part by the exterior surface of the inwardly curved wall portion provided on the side of the stator cavity. A rotary transfer valve is secured on a shaft to rotate in the additional cavity. The rotary transfer valve is in the form of a cylindrical plug having generally U-shaped pockets on diametrically opposed sides thereof and having its periphery sealingly contacting the cylindrical interior surface of the additional cavity as it rotates therein.

The side segment portion of the stator housing is provided with an intake passage leading into the front end of the arcuate compression chamber and an exhaust passage leading out of the rear end of the arcuate expansion chamber. The curved wall portion which is common to the sides of the cavities for the power rotor and the rotary transfer valve is provided with a transfer inlet port leading out of the rear end of the compression chamber and a transfer outlet port leading into the front end of the expansion chamber.

A cam wheel assembly including a backside cam wheel and a frontside cam wheel is secured to the drive shaft of the power rotor. A follower in the form of a timing wheel is secured to the shaft of the rotary transfer valve. The timing wheel has two diametrically opposed notches on the periphery thereof which are respectively aligned to be positioned adjacent the leading edge of the two pockets on the rotary transfer valve. The cam wheel assembly has two diametrically opposed initiating pins provided on the back surface thereof for respectively engaging the two notches on the timing wheel to intermittently rotate the rotary transfer valve. The timing wheel also has two sets of pins on the surface thereof which are positioned so as to be engaged by recesses and notches provided on the peripheries of the two rotating cam wheels so as to further control the intermittent rotary action of the rotary transfer valve in relation to the rotating of the two vanes.

A fuel-air mixture introduced into the compression chamber through the intake passage is compressed by one of the vanes and transferred to one of the pockets of the rotary transfer valve which is positioned opposite the transfer inlet port by the action of the cam wheel assembly. The rotary transfer valve is then rotated by the action of the cam wheel assembly such that the pocket is initially positioned between the transfer inlet port and the transfer outlet port where it momentarily remains stationary while the vane continues to rotate. As a result, upon the pocket on the rotary transfer valve being positioned by the action of the cam wheel assembly opposite the transfer outlet port it delivers the quantity of compressed fuel-air mixture therein into the front end of the expansion chamber behind the vane. Upon the pocket being further moved by the action of the cam wheel assembly beyond the transfer outlet port, a spark plug positioned in the wall of the stator housing fires to explode the fuel-air mixture and drive the vane through the expansion chamber, the exhaust gases resulting from the explosion being forced out of the exhaust passage by the rotation of the following vane.

Accordingly, one of the objects of the present invention is to provide an improved rotary transfer valve mechanism for a rotary internal combustion engine which provides for transferring a compressed quantity of fuel-air mixture from the leading to the trailing side of a vane during the operation thereof.

Another object of the present invention is to provide cam means synchronized to rotate with a power rotor having sliding vanes on diametrically opposed slots of the periphery thereof for intermittently controlling the rotation of a rotary transfer valve having pockets on diametrically opposed portions of the periphery thereof so as to enable each pocket to transfer a fully pressurized fuel-air mixture from the leading side to the trailing side of a vane as the vane advances from the compression chamber to the expansion chamber of a rotary internal combustion engine.

Yet another object of the present invention is to provide a cam wheel assembly keyed to the shaft of the power rotor of a rotary internal combustion engine for intermittently controlling the rotation of a timing wheel keyed to the shaft of a rotary transfer valve to provide for a quantity of compressed fuel-air mixture to be transferred by a pocket on the periphery of the rotary transfer valve from the leading side to the trailing side of a vane on the rotor.

With these and other objects in view, the invention consists of the construction, arrangement and combination of the various parts of the device whereby the objects contemplated are attained, as hereinafter set forth, pointed out in the appended claims and illustrated in the accompanying drawings.

BRIEF DESCRIPTION OF THE DRAWINGS

FIG. 1 is a perspective view of the internal rotary combustion engine of the present invention;

FIG. 2 is an end view of the engine as taken on line 2—2 of FIG. 1;

FIG. 3 is a horizontal sectional view of the engine as taken on line 3—3 of FIG. 2 but with the vanes on the power rotor shown in a horizontal position;

FIG. 4 is an end view of the engine showing the position of the cam wheel assembly and the timing wheel when one of the vanes on the power rotor starts to compress the fuel-air mixture in the compression chamber;

FIG. 4a is a partly sectional view of a portion of FIG. 4;

FIG. 5 is an end view of the engine showing the position of the cam wheel assembly and the timing wheel when the rotary transfer valve has been rotationally advanced such that one of its pockets is located opposite the transfer inlet port;

FIG. 6 is an end view of the engine showing the position of the cam wheel assembly and timing wheel when a vane on the power rotor is effectively sweeping the fully compressed fuel-air mixture contained in the rear end of the compression chamber into a pocket of the rotary transfer valve;

FIG. 6a is a partly sectional view of a portion of FIG. 6;

FIG. 7 is an end view of the engine showing the position of the cam wheel assembly and the timing wheel when the rotary transfer valve has been rotationally advanced such that its pocket containing the compressed fuel-air mixture is located between the transfer inlet port and the transfer outlet port;

FIG. 8 is an end view of the engine showing the position of the cam wheel assembly and the timing wheel when the rotary transfer valve has been rotationally advanced to locate the pocket containing the compressed fuel-air mixture opposite the transfer outlet port to thereby deliver the mixture into the front end of the expansion chamber behind the vane;

FIG. 8a is a partly sectional view of a portion of the showing in FIG. 8;

FIG. 9 is an end view of the engine showing the position of the cam wheel assembly and the timing wheel when the rotary transfer valve has been rotationally advanced to locate its pocket beyond the transfer outlet port at which time the spark plug ignites the mixture;

FIG. 9a is a partly sectional view of a portion of the showing in FIG. 9;

FIG. 10 is an end view of the engine showing the position of the cam wheel assembly and the timing wheel when the rotary transfer valve has been rotationally advanced such that the other of its pockets is located opposite the transfer inlet port; and FIG. 11 is a perspective view showing how two rotary internal combustion engines of the present invention can be mounted in tandom to rotate a single drive shaft.

DESCRIPTION OF THE PREFERRED EMBODIMENT

Referring to FIGS. 1–3 of the drawings, the engine 10 of the present invention comprises a housing 14 having on one end thereof an integral wall 15 and having on the other end thereof a cover 16 which is attached by bolts 16a. As shown in FIGS. 2 and 3, a power rotor 12 is mounted to rotate within a stator cavity provided in the housing 14 on a drive shaft 17 supported on suitable bearings 18 and 19 mounted in the end wall 15 and the end cover 16, respectively.

The interior surface 20 of the stator cavity in which the power rotor 12 rotates is generally ovally shaped in that one of the inner sides thereof is formed by a segment portion 21 provided with an inwardly extending tip 23 on the interior surface thereof while the diametrically opposite inner side thereof is formed by an inwardly curved wall portion 22 provided with a crest 24 on the interior surface thereof.

The power rotor 12 has two diametrically opposed reciprocating sliding vanes 29a and 29b thereon. As shown in FIGS. 2 and 3, vane 29a includes an outer end portion 32a having a pair of end support members 30a and a center post 27a. The vane 29a is positioned on the rotor 12 with its outer end portion 32a residing in a peripheral slot 34a, its pair of support members 30a residing in radially extending slots 31a provided on opposite end faces of the rotor 12, and its center post 27a positioned within a spring coil 33a in a central radial hole 38a provided on the bottom of the peripheral slot 34a. The vane 29b is similarly shaped and positioned in similar slots provided on the diametrically opposite end of the power rotor 12. Thus, the outer end portions 32a and 32b of the vanes 29a and 29b are urged by the spring coils 33a and 33b, respectively, to be held with a sealing contact against the interior surface 20 of the stator cavity as the power rotor 12 rotates.

It should be especially noted that when the power rotor 12 rotates on its shaft 17, the outer periphery thereof has a sealing contact with the tip 23 and the crest 24 on the inner sides of the stator cavity so as to divide the circumferential space between the power rotor 12 and the interior surface 20 of the stator cavity into two arcuate chambers, a compression chamber 25 and an expansion chamber 26.

A rotary transfer valve 42 which is in the form of a cylindrical plug with generally U-shaped pockets 46a and 46b on diametrically opposed portions of the periphery thereof is mounted to rotate within an additional cavity provided on a side portion of the housing 14 on a shaft 50 supported on suitable bearings 57 and 58 mounted in the end wall 15 and the end cover 16, respectively. The cylindrical interior surface 28 of the additional cavity in which the rotary transfer valve 42 rotates is formed in part by the outwardly curved back surface of the inwardly curved side wall portion 22 forming the stator cavity for the power rotor 12. Thus, the curved side wall portion 22 is common to both the power rotor cavity and the rotary transfer valve cavity. The cavity for the rotary transfer valve 42 is of such a size that the periphery of the rotary transfer valve 42 has a sealing engagement with the interior surface 28 thereof as it rotates.

With reference to the direction of the rotation of the power rotor 12, intake and exhaust passages 36 and 37, respectively, are formed in the side segment portion 21 of the housing 14. The intake passage 36 feeds a fuel-air mixture from a carburetor means 41 into the downstream end, i.e., the front end of the compression chamber 25 and the exhaust passage 37 feeds exhaust gases from the upstream end, i.e., the rear end, of the expansion chamber 26 into exhaust means 35. A transfer inlet port 39 and a transfer outlet port 40 are formed on the curved side wall portion 22 common to the cavities for the power rotor 12 and the rotary transfer valve 42. The transfer inlet port 39 is on the upstream end of the compression chamber 25 and the transfer outlet port 40 is on the downstream end of the expansion chamber 26.

As the power rotor 12 rotates, a compressed charge of fuel-air mixture on the leading side of the vane 29a which is rotating in the upstream end of the compression chamber 25 is effectively swept through the transfer inlet port 39 into a pocket 46a of the rotary transfer valve 42 (FIG. 6). The pocket 46a on the rotary transfer valve 42 is then rotated and momentarily held in position on the common curved side wall portion 22 intermediate the transfer inlet port 39 and transfer outlet port 40 (FIG. 7) while the vane 29a continues to advance. Thus, by the time the pocket 46a is positioned opposite the transfer outlet port 40 (FIG. 8), the pressurized fuel-air mixture therein is delivered into the downstream end, i.e., the front end of the expansion chamber 26 just behind the vane 29a (FIG. 8a). The pocket 46a on the rotary transfer valve 42 is then rotated so as to be positioned just past the transfer outlet port 40 at which time the spark plug 70 fires (FIG. 9a). The rotary transfer valve 42 is then rotated so as to position the other pocket 46b opposite the transfer inlet port 39 (FIG. 10).

To control the movement of the rotary transfer valve 42 in the manner above described, a cam wheel assembly 60 is mounted on the power rotor drive shaft 17 and a timing wheel 51 is mounted on the rotary transfer valve shaft 50.

As shown in FIG. 4, the timing wheel 51 has on the face thereof two sets of axially-projecting angularly spaced timing pins, one set including pins 53a, 54a and 55a, and the other set including pins 53b, 54b and 55b. The pins 53a and 53b are shorter then the other pins in each set, as indicated in FIG. 3. The timing wheel 51 also has a pair of diametrically opposed notches 56a and 56b formed on the periphery thereof. These notches 56a and 56b are located on the timing wheel 51 opposite the leading edges of the respective pockets 46a and 46b provided on the rotary transfer valve 42.

As will be described in detail hereinafter, the cam wheel assembly 60 has pins, recesses and notches on diametrically opposed angular portions of the periphery thereof which engage the notches and the two sets of three timing pins 53a, 54a, 55a and 53b, 54b, 55b on diametrically opposed portions of the timing wheel 51 to impart a intermittent rotary motion to the rotary transfer valve 42 so that the respective pockets 46a and 46b intermittently rotate in a predetermined timed relation with respect to the two vanes 29a and 29b on the power rotor 12.

In particular, the cam wheel assembly 60 comprises a flat backside cam wheel 61 and a flat frontside cam wheel 63 which lie against each other and are attached by their centers to the drive shaft 17 that is driven in a clockwise direction by the power rotor 12.

As seen in FIG. 4, for example, the periphery of the backside cam wheel 61 has formed on a first angular portion thereof an arcuate recess 65a followed by successive V-shaped notches 66a and 67a and has formed on a second angular portion thereof diametrically opposite the first angular portion an identically formed arcuate recess 65b followed by successive V-shaped notches 66b and 67b. The lengths of arcuate recesses 65a and 65b substantially correspond to the length of the inwardly curved side wall portion 22 on the interior surface 20 of the stator cavity within housing 14. On the backside cam wheel 61, the outer circular periphery between the arcuate recess 65a and the V-shaped notch 67b is designated 62a and the outer circular periphery between the arcuate recess 65b and V-shaped notch 67a is designated 62b. The backside cam wheel 61 is further provided with a pair of diametrically opposed initiating pins 59a and 59b positioned inwardly of the outer periphery thereof just ahead of the arcuate recesses 65a and 65b, respectively.

The frontside cam wheel 63 which is generally larger in diameter than the backside cam wheel 61 has formed on the periphery thereof a first angular portion provided with an arcuate recess 68a followed by V-shaped notches which are lateral extensions of the V-shaped notches 66a and 67a on the backside cam wheel 61 and has formed on a second angular portion thereof diametrically opposite the first angular portion an identically formed arcuate recess 68b followed by V-shaped notches which are lateral extensions of the V-shaped notches 66b and 67b on the backside cam wheel 61. On the frontside cam wheel 63, the outer circular periphery between arcuate recess 68a and the V-shaped notch 67 is designated 64a and the outer circular periphery between the arcuate recess 68b and V-shaped notch 67a is designated as 64b.

Reference will next be made to FIGS. 4–10 which are views illustrative of the positions of the cam wheel assembly 60 and the timing wheel 51 at various stages of the rotation of the power rotor 12 and the rotary transfer valve 42 with respect to the housing 14 during the operation of engine 10.

It should be noted that during the operation of engine 10, when viewed from the end of the engine 10 as depicted in FIG. 4, the power rotor 12 and therefore the cam wheel assembly 60 rotate continuously in a clockwise direction whereas the timing wheel 51 and therefore the transfer rotary valve 42 rotate counterclockwise in an intermittent fashion.

As illustrated in FIG. 4, as the vane 29a rotates past the intake passage 36, the fuel-air mixture previously drawn by vane 29b into the compression chamber 25 ahead of the vane 29a is compressed. Note that at this time the pocket 46a in the rotary transfer valve 42 is not yet opposite the transfer inlet port 39. However, the transfer inlet port 39 is closed off by the periphery of rotary transfer valve 42. As the cam wheel assembly 60 continues to rotate in a clockwise direction, first the pin 54b on the timing wheel 51 is contacted by the side of the V-shaped notch 66b on the cam wheel assembly 60 causing the timing wheel 51 to rotate counterclockwise, and then the pin 55b on timing wheel 51 is contacted by the side of V-shaped notch 67b on the cam wheel assembly 60 causing the timing wheel 51 to further rotate counterclockwise.

As illustrated in FIG. 5, when the pin 55b once starts to ride on the outer circular periphery 64a of the frontside cam wheel 63, the shorter pin 53a on timing wheel 51 contacts the outer circular periphery 62a of the backside cam wheel 61. This causes the rotary transfer valve 42 to remain stationary with its pocket 46a positioned opposite the transfer inlet port 39 on the curved side wall portion 22 forming part of the cavity in which the rotary transfer valve 42 rotates.

The rotary transfer valve 42 remains in this position until the vane 29a rotates so as to completely compress the fuel-air mixture and effectively sweep it through the transfer inlet port 39 into pocket 46a of the rotary transfer valve 42, as illustrated in FIGS. 6 and 6a.

At this instant, the initiating pin 59a on the surface of the backside cam wheel 61 engages the side of notch 56a on the timing wheel 51 causing the latter and thereby rotary transfer valve 42 to rotate so as to position the pocket 46a in which the fuel-air mixture is trapped against the curved side wall portion 22 intermediate the transfer inlet port 39 and the transfer outlet port 40, as illustrated in FIG. 7. Inasmuch as the short pin 53a on the timing wheel 51 is now in contact with the arcuate recess 65a on the backside cam wheel 61 and pin 54a is in contact with the arcuate recess 68a on frontside cam wheel 63, the pocket 46a remains in its position in which it entraps the compressed mixture while the vane 29a continues to rotate on past the curved side wall portion 22.

As illustrated in FIG. 8, it is not until pin 53a on the timing wheel 51 is engaged by the side of the arcuate recess 65a on the backside cam wheel 61 that the rotary transfer valve 42 and therefore pocket 46a is rotated into a position opposite transfer outlet port 40. This enables transfer of the compressed fuel-air mixture therein into the initial portion of the expansion chamber 26 behind the trailing side of vane 29a (FIG. 8a).

As illustrated in FIG. 9, as the vane 29a continues to rotate, the side of V-shaped notch 66a contacts pin 54a causing the rotary transfer valve 42 to further rotate such that pocket 46a advances just past the transfer outlet port 40. This results in completely enclosing the compressed fuel-air mixture in the front end portion of the expansion chamber 26. At this instant, as indicated in FIG. 9a, the spark plug 70 ignites the compressed fuel-air mixture contained therein. As a result of the explosion, the vane 29a is forced to rotate clockwise as indicated in FIG. 10. As a result of the rotation of vane 29a, the previously ignited fuel-air mixture which is in the expansion chamber 26 on the leading side of the vane 29a is driven out through the exhaust passage 37.

It should be understood that the pin 55a on the timing wheel 51 is now in contact with the outer circular peripheral portion 64b on the frontside cam wheel 63 and the pin 53b rides on the outer circular peripheral portion 62b of the backside cam wheel 61 thus resulting in the other transfer pocket 46b being positioned opposite the transfer inlet port 39 while the fuel-air mixture in the compression chamber 25 is being compressed by the rotation of the vane 29b. The timing of the following intermittent movement of the pocket 46b of the rotary transfer valve 42 relative to the vane 29b is then controlled initially by the action of the initiating pin 59b on the cam wheel assembly 60 on the notch 56b of timing wheel 51 and then by the action of the recesses 65b and 68b and notches 66b and 67b on the periphery of the cam wheel assembly 60 with the pins 53b, 54b and 55b of the timing wheel 51 in the manner as previously described for the movement of the pocket 46a relative to the vane 29a.

It should be noted that each of the vanes 29a and 29b provides for the operations of intake, compression, explosion and exhaust during each cylindrical rotation thereof. Since the two vanes 29a and 29b are spaced 180 degrees apart, there are two power cycles performed for every revolution of the power rotor.

As shown in FIG. 11, a pair of the engines 10 and 10' of the present invention can be mounted in tandom on a single drive shaft 17. Thus, the cam wheel assembly 60 of engine 10 may be positioned, for example, ninety degrees behind the cam wheel assembly 60' of engine 10'. The timing wheels 51 and 51' on the respective rotary transfer valves 42 and 42' (not shown) each rotate on their own shafts 50 and 50' inasmuch as their intermittent rotary motions must be independent of each other and of the drive shaft 17. It should now be clearly understood that any number of the engines 10 of the present invention can be mounted in tandem to drive the single drive shaft 17 with their cam wheel assemblies having a staggered angular relationship.

Although the description herein has been concerned with a particular embodiment of the present invention, it is to be understood that the invention is subject to various modifications in both the construction and arrangement thereof. The invention, therefore, should be considered as including all possible variations and modifications coming within the scope and spirit of the invention as defined in the appended claims.

What is claimed is:

1. A rotary internal combustion engine comprising:
    a stator housing defining a power rotor cavity therein;
    a power rotor rotatably mounted in said power rotor cavity and combining therewith to form an arcuate compression chamber and an arcuate expansion chamber;
    a pair of diametrically disposed sliding vanes mounted on said power rotor, the outer end of each vane maintaining contact with the internal surface of said power rotor cavity during rotation of said power rotor;
    an intake passage for transferring a quantity of fuel-air mixture into said arcuate compression chamber;
    an exhaust passage for transferring exhaust gases resulting from combustion out of said arcuate expansion chamber;
    each vane operable during each rotation of said power rotor to pass through the arcuate compression chamber to compress a quantity of fuel-air mixture and to pass through the arcuate expansion chamber upon the burning of said quantity of fuel-air mixture;
    a rotary transfer valve housing forming a part of said stator housing and defining a cylindrical cavity therein located adjacent said power rotor cavity so as to have a common internal wall portion therewith;
    a rotary transfer valve in the form of a plug having a pair of diametrically disposed pockets formed on the periphery thereof and rotatably mounted to have sealing contact with the wall of the cylindrical cavity in said rotary transfer valve housing;
    a first port in the common internal wall portion of said power rotor cavity and said rotary transfer valve cavity for transferring a quantity of compressed fuel-air mixture in said arcuate compression chamber into a pocket of said rotary transfer valve;
    a second port in the common internal wall portion of said power rotor cavity and said rotary transfer valve cavity for transferring said quantity of compressed fuel-air mixture out of the pocket of said rotary transfer valve into said arcuate expansion chamber behind the vane used to compress said quantity of fuel-air mixture;
ignition means for igniting said quantity of fuel-air mixture in said arcuate expansion chamber;
a cam wheel assembly mounted to rotate with said power rotor;
said cam wheel assembly including a first cam wheel and a second cam wheel larger in diameter than said first cam wheel;
said first cam wheel having formed on an angular portion of the periphery thereof an arcuate recess followed by a pair of V-shaped notches and having on a diametrically disposed angular portion of the periphery thereof a similarly formed arcuate recess followed by a pair of V-shaped notches, the remaining outer periphery of said first cam wheel being circularly formed;
said first cam wheel having on the face thereof a pair of diametrically disposed initiating pins located just ahead of the arcuate recesses on the periphery thereof;
said second cam wheel having on an angular portion of the periphery thereof an arcuate recess followed by a pair of V-shaped notches forming lateral extensions of the V-shaped notches on said first cam wheel, and having on a diametrically disposed angular portion of the periphery thereof a similarly formed arcuate recess followed by a pair of V-shaped notches forming lateral extensions of the V-shaped notches on said first cam wheel, the remaining outer periphery of said second cam wheel being circularly formed;
a timing wheel mounted to rotate with said rotary transfer valve;
first and second sets of spaced pins on diametrically disposed portions of the face of said timing wheel; and
a pair of diametrically disposed notches on the periphery of said timing wheel, said notches respectively substantially aligned with the leading edges of said pair of pockets on said rotary transfer valve;
said arcuate recesses and V-shaped notches on said cam wheel assembly coacting with the sets of pins on the face of said timing wheel and said pins on said first cam wheel respectively engaging said notches on said timing wheel to position each pocket on said rotary transfer valve opposite the first port to receive the quantity of compressed fuel-air mixture being compressed by a vane in said arcuate compression chamber and opposite the second port to deliver the quantity of fuel-air mixture into said arcuate expansion chamber behind said vane.

2. A rotary internal combustion engine as defined in claim 1 wherein there are three pins in each said first and second sets of spaced pins on the face of said timing wheel and one of the pins in each set is shorter than the others in the set.

3. A rotary internal combustion engine as defined in claim 1 wherein a pocket on said rotary transfer valve is held in position opposite said first port by a pin of a first set of spaced pins on the face of said timing wheel riding on the circular outer periphery of said first cam wheel and by a pin of a second set of spaced pins on the face of said timing wheel riding on the circular outer periphery of said second cam wheel.

4. A rotary internal combustion engine as defined in claim 1 wherein an initiating pin on the face of said first cam wheel engages a notch on the periphery of said timing wheel to incrementally rotate said rotary transfer valve and thereby position a pocket thereon opposite said common internal wall portion intermediate said first port and said second port.

5. A rotary internal combustion engine as defined in claim 4 wherein after said pocket on said rotary transfer valve has been positioned opposite the common internal wall portion intermediate said first port and said second port, said rotary transfer valve is held in position by one pin of a set of spaced pins on the face of said timing wheel riding on an arcuate recess on the periphery of said first cam wheel and another pin of said set of spaced pins on the face of said timing wheel riding on an arcuate recess on the periphery of said second cam wheel.

6. A rotary internal combustion engine comprising:
a housing;
a power rotor mounted to rotate on a shaft in a generally ovally shaped cavity in said housing and combining therewith to form an arcuate compression chamber and an arcuate expansion chamber;
a pair of sliding spring-loaded vanes mounted on diametrically disposed sides of said power rotor;
an intake passage for a quantity of fuel-air mixture at the entrance end of said arcuate compression chamber;
an outlet passage for exhaust gases at the exit end of said arcuate expansion chamber;
a rotary transfer valve mounted to rotate on a shaft in a cylindrical cavity in said housing having a common wall with said ovally shaped cavity;
said common wall having a transfer inlet port at the exit end of said arcuate compression chamber and a transfer outlet port at the entrance end of said arcuate expansion chamber;
ignition means located adjacent the entrance end of said arcuate expansion chamber;
a cam wheel assembly connected to the shaft of said power rotor to continuously rotate therewith;
said cam wheel assembly including a first cam wheel and a second cam wheel having a larger diameter than said first cam wheel;
said first cam wheel having on diametrically disposed angular portions of the periphery thereof an arcuate circular recess followed by first and second V-shaped notches, the remaining periphery of said first cam wheel being circular;
said first cam wheel having on the face thereof a pair of diametrically disposed initiating pins located just ahead of the arcuate circular recesses on the periphery thereof;
said second cam wheel having formed on diametrically disposed angular portions of the periphery thereof an arcuate circular recess followed by first and second V-shaped notches forming lateral extensions of the first and second V-shaped notches on said first cam wheel, the remaining periphery of said second cam wheel being circular;
a timing wheel connected to the shaft of said rotary transfer valve;
said timing wheel having first and second sets of three angularly spaced pins on diametrically disposed portions of the face thereof and a pair of diametrically disposed notches on the periphery thereof, said notches respectively substantially aligned with the leading edges of said pair of pockets on said rotary transfer valve;

said cam wheel assembly and timing wheel so constructed and arranged that the coaction of the first and second V-shaped notches and said arcuate circular recesses on said first and second cam wheels with the sets of angularly spaced pins on the face of said timing wheel together with the coaction of the pair of initiating pins on the face of said first cam wheel with the pair of notches on said timing wheel control the incremental rotation of said timing wheel to enable each pocket on said rotary transfer valve to receive through said transfer inlet port the fuel-air mixture compressed by a vane passing through said arcuate compression chamber and to deliver said compressed fuel-air mixture through said transfer outlet port to the entrance end of said arcuate expansion chamber behind said vane.

7. A rotary internal combustion engine as defined in claim 6 wherein a pin of said first set of angularly spaced pins on the face of said timing wheel rides on the circular periphery of said first cam wheel and a pin of said second set of angularly spaced pins on the face of said timing wheel rides on the circular periphery of said second cam wheel for holding said rotary transfer valve in position with a pocket thereof opposite said transfer inlet port to receive the fuel-air mixture as it is being compressed by the vane passing through said arcuate compression chamber.

8. A rotary internal combustion engine as defined in claim 6 wherein an initiating pin on the face of said first cam wheel engages a notch on the periphery of said timing wheel to cause said rotary transfer valve to be incrementally rotated so as to position a pocket thereon on said common wall intermediate the transfer inlet port and the transfer outlet port and wherein two pins of the same set of angularly spaced pins on said timing wheel respectively ride on arcuate circular recesses of said first and second cam wheels for holding said rotary transfer valve in position with said pocket intermediate the transfer inlet port and the transfer outlet port while the vane rotates therepast.

9. A rotary internal combustion engine as defined in claim 6 wherein the side of an arcuate circular recess on said first cam wheel contacts a pin on the face of said timing wheel thereby causing the rotary transfer valve to incrementally rotate to position said pocket on said rotary transfer valve opposite the transfer outlet port.

10. A rotary internal combustion engine as defined in claim 6 wherein the side of a first V-shaped notch on said second cam wheel contacts a pin on the face of the timing wheel thereby causing the rotary transfer valve to incrementally rotate to position said pocket beyond the transfer outlet port.

11. A rotary internal combustion engine as defined in claim 6 wherein the side of a second V-shaped notch on said second cam wheel contacts a pin on the face of the timing wheel thereby causing the rotary transfer valve to incrementally rotate to position the other pocket thereon opposite the transfer inlet port.

12. A rotary internal combustion engine comprising:
a power rotor mounted to rotate on a shaft in a generally ovally shaped cavity in said housing and combining therewith to form an arcuate compression chamber and an arcuate expansion chamber;
a pair of spring-loaded sliding vanes mounted on diametrically disposed sides of said power rotor;
an intake passage for a quantity of fuel-air mixture at the entrance end of said arcuate compression chamber;
an outlet passage for exhaust gases at the exit end of said arcuate expansion chamber;
a rotary transfer valve having a pair of diametrically disposed pockets mounted to rotate on a shaft in a cylindrical cavity in said housing having a common wall with said ovally shaped cavity;
said common wall having a transfer inlet port at the exit end of said arcuate compression chamber and a transfer outlet port at the entrance end of said arcuate expansion chamber;
ignition means located within the entrance end of said arcuate expansion chamber;
cam wheel means connected to the shaft of said power rotor to continuously rotate therewith, said cam wheel means having circular recesses and notches on portions of the circular periphery thereof and pins on the face thereof;
timing wheel means connected to the shaft of said rotary transfer valve, said timing wheel means having notches on the periphery thereof and pins on the face thereof;
the circular recesses and notches on the periphery of and the pins on the face of said continuously rotating cam wheel means adapted to slidingly contact the pins on the face of and the notches on the periphery of said timing wheel means to sequentially incrementally rotate said rotary transfer valve to position and hold one of the pockets thereon opposite said transfer inlet port to receive the fuel-air mixture being compressed by one of said vanes passing through said arcuate compression chamber, to position and hold one of said pockets on said common wall intermediate said transfer inlet port and said transfer outlet port to enable said vane to move therepast, to position and momentarily hold said one of said pockets opposite said transfer outlet port to deliver the compressed fuel-air mixture therein into said arcuate expansion chamber behind the vane used to compress the fuel-air mixture, to position and momentarily hold said one of said pockets just beyond said transfer outlet port at which time the ignition means fires to explode the fuel-air mixture and drive the vane through the arcuate expansion chamber, and thereafter to position and hold the other of said pockets on the rotary transfer valve opposite said transfer inlet port to receive the fuel-air mixture being compressed by the other of said vanes passing through said arcuate compression chamber.

* * * * *